Oct. 24, 1967
C. A. ROBERTSON ETAL
3,349,232
ENCAPSULATED LIGHT SOURCE
Filed July 2, 1965
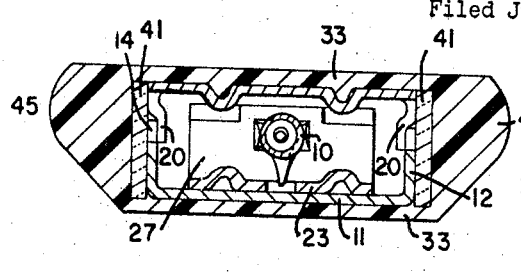
FIG. 2
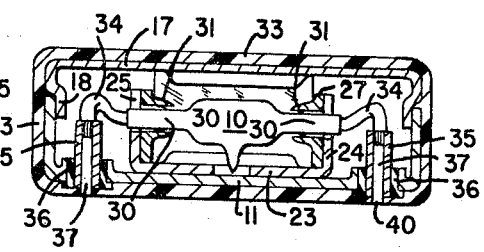
FIG. 3
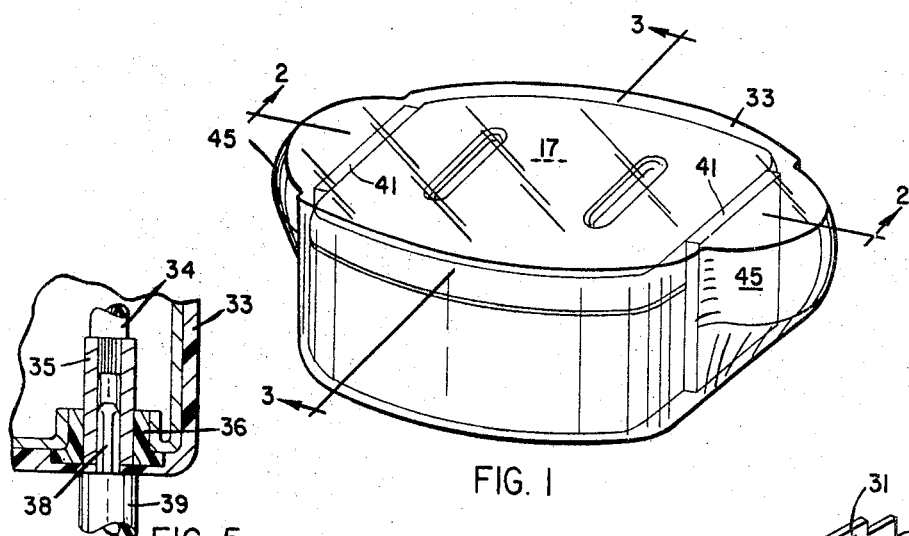
FIG. 1
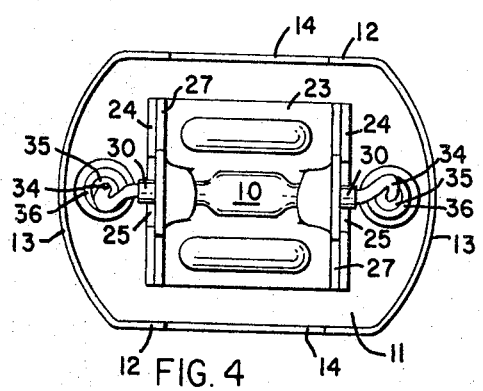
FIG. 5
FIG. 4
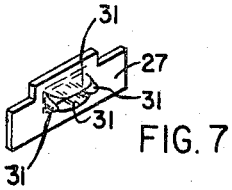
FIG. 7
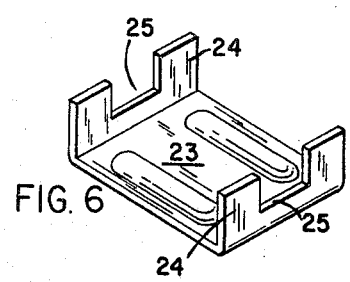
FIG. 6
INVENTORS.
CHARLES A. ROBERTSON.
BY FREDRICK B. SMALL.
D. Emmett Thompson
ATTORNEY.

United States Patent Office 3,349,232
Patented Oct. 24, 1967

3,349,232
ENCAPSULATED LIGHT SOURCE
Charles A. Robertson, Syracuse, and Frederick B. Small, Moravia, N.Y., assignors to Crouse-Hinds Company, Syracuse, N.Y.
Filed July 2, 1965, Ser. No. 469,141
5 Claims. (Cl. 240—1.2)

ABSTRACT OF THE DISCLOSURE

A metal container fully encapsulated with transparent, plastic material having elastomeric qualities, a heat conducting means supporting a high temperature lamp in the container in heat exchanging relation thereto. The encapsulating material may be formed with a lens portion.

---

This invention relates to a light source employing a high temperature electric lamp. Lamps of this type are commonly known as quartz lamps that embody a concentrated filament encased in a quartz envelope. Due to the fact that the envelope is formed of quartz, the envelope need only be a dimension sufficient to accommodate the filament. The quartz envelope has the quality of functioning at the high temperature resulting from its proximity to the high temperature filament. The result is that these lamps, even though of substantial wattage, are only a small fraction of an inch in diameter.

The overall small dimension coupled with high wattage output renders lamps of this type particularly advantageous for installations where space is at a premium.

While the quartz envelope is capable of operating at the high temperature, it is important to maintain the ends of the envelope, in which the lead-in wires for the filament are sealed, at a temperature not exceeding a predetermined value.

An example of an installation in which the quartz lamp can be used advantageously is a lighting unit for embedment in the pavement at an airport, such as a taxi runway, or landing strip. Such lighting units can project only a fraction of an inch above the surface of the pavement. In addition to the dimensional limitation, such lighting units operate under particularly adverse conditions. The unit is frequently immersed in water and slush and, of course, are subjected to substantial variations in temperature, not only by the operation of the lamp, but also due to the diurnal cycle. The sections and parts of present units of this type are now joined together by bolts and screws, and gaskets are provided for the joints between the parts. Due to the frequent temperature changes resulting in the expansion and contraction of the units, gasket failure is common, and with the units immersed in water or slush, moisture enters the units causing failure of the lamp.

These pavement units are also subject to high levels of mechanical shock and vibration caused by engagement by a non-rotating aircraft landing wheel, braked or otherwise, and engagement by the blades of snowplows. Also, such units are subject to excessive vibration, especially by the high velocity exhaust discharge from jet propelled planes. The light source embodying my invention is not adversely affected by the conditions above referred to.

This invention has as an object a light source fully encapsulated in transparent plastic material having elastomeric qualities, whereby the unit is effectively insulated against shock and vibration. The light source further embodying a structure which functions efficiently to dissipate heat produced by the lamp, all whereby the life expectancy of the lamp is extended to a considerable extent.

The invention has as a further object an encapsulated light source wherein the encapsulating material is formed with a lens portion.

The invention consists in the novel features and in the combinations and constructions hereinafter set forth and claimed.

In describing this invention, reference is made to the accompanying drawings in which like characters designate corresponding parts in all the views.

In the drawings —

FIGURE 1 is an isometric view of a ligt source embodying my invention.

FIGURE 2 is a sectional view taken on lines 2—2, FIGURE 1.

FIGURE 3 is a view taken on line 3—3, FIGURE 1.

FIGURE 4 is a top plan view of the metallic container with the cover removed.

FIGURE 5 is an enlarged view of the lower right hand portion of FIGURE 3.

FIGURES 6 and 7 are isometric views of the lens supporting members.

The quartz lamp, indicated at 10, is mounted in a metallic container having a flat bottom wall 11, side walls 12 and curved end walls 13. The container is formed of sheet metal, preferably having high heat conductivity, such as copper. One, or as here shown, both of the side walls 12 are formed with notches 14 in their upper edges. The open top of the container is provided with a closure 17 having a depending peripheral flange 18 formed to extend within the side walls 12 and end walls 13. The flange 18 of the cover is formed at opposite sides thereof with notches 20 arranged in registration with the notches 14, see FIGURE 2. The notch formations provide openings for the emission of light from the lamp 10.

The lamp 10 is mounted in a support, which includes a U-shaped metallic member having a bottom wall 23 and upstanding end walls 24 formed with notches 25.

The lamp support further includes plate members 27 having a length comparable to the length of the upstanding end walls 24, and pierced to form apertures for the reception of the end portions 30 of the lamp 10, and providing flanges, or prongs 31 engaging the end portions 30 of the lamp. The plate members 27 are positioned against the inner surfaces of the end walls 24 of the U-shaped member and are affixed thereto in heat exchanging relation therewith. The bottom wall 23 of the U-shaped member is also fixedly secured to the bottom wall 11 of the container in heat exchanging relation therewith.

The container, with the cover closure thereon, is completely encapsulated with transparent plastic material 33 having elastomeric qualities. Leads 34 extending from the end portions 30 of the lamp 10 are connected to current conducting contacts 35. The contacts 35 are fixedly mounted in the bottom wall 11 of the container by means of suitable adhesive material 36 having insulating qualities. The contacts 35 shown are of the female type formed with a bore 37 extending inwardly from their outer ends for the reception of a prong portion 38 of a contact 39, which is fixedly mounted in the casing or housing of the light unit in which the light source is employed.

The contacts 35 do not extend through the encapsulating material 33, see FIGURE 5. The encapsulating material is formed with an aperture 40 in registration with the bore 37 of the contact 35 to permit insertion of the prong 38 into the contact 35.

This arrangement provides for jack mounting of the light source in the lighting fixture or unit. Also, the encapsulant between the outer ends of the contacts 35 and the shoulders of the contacts 39 provides a seal to prevent entrance of moisture in the bore 37 of contact 35. Preferably, the prong portion 38 of contact 39 is of resilient form to lessen the transmission of vibration from the light unit to the light source.

To obtain a specific distribution of light from the light source, the encapsulant 33 may be of optical grade and during encapsulation of the light source, the encapsulant may be formed with a lens portions 45 arranged in registration with each of the openings in the container formed by the notches 14, 20, previously referred to. The formation of the lens portions 45 with the encapsulant has a number of advantages for certain installations, including the lighting units embedded in airport runways. Due to the resiliency of this material, objects such as stones and the like striking the lens at high velocity effected by propeller backwash or jet exhaust, do not break or abrade the lens. The lens being of resilient material will give upon such impacts or from any other type of mechanical shock. The encapsulant lens portion 45 is also unaffected by ice formation and by expansion and contraction forces. A suitable encapsulating material is optical grade silicone rubber such as RTV–615 manufactured by the General Electric Company.

Prior to the encapsulation of the container, plates 41 of transparent material, such as glass, may be positioned in registration with the light emitting openings in the side walls of the container, and the plates 41 may serve, if desired, as filters for the beam emitted from the lens 10. Also, the plates 41 may be formed with a lens portion covered by the encapsulant.

The light source described is employed as a throw-away light source modulant. It is conveniently replaced by the jack mounting. It is not adversely affected by high levels of vibration or mechanical shock.

What we claim is:

1. An encapsulated light source comprising a metallic container formed with an opening in one side wall thereof, a metallic lamp support fixedly mounted in said container in heat exchanging relation thereto, said lamp support having means for attachment to the envelope of a high temperature lamp at the areas thereof in which the lead in wires are sealed, said container and lamp support forming a heat sink for said lamp, a metallic cover positioned on the open top of said container, said container and cover being fully encapsulated in plastic material having elastomeric and optical qualities, said plastic material being shaped to form a lens in registration with said opening, and current conducting contact means fixedly mounted in said container and having a portion accessible exteriorly of said encapsulating material.

2. An encapsulated light source comprising a closed metallic container formed with an opening in one side wall thereof, a metallic lamp supporting means fixedly mounted in said container in heat exchanging relation thereto, a quartz lamp mounted in said support in heat exchanging relation thereto, said lamp being positioned by said support in spaced relation to the walls of said container and in registration with the opening therein, said container being fully encapsulated in transparent plastic material having elastomeric qualities, current conducting contact means fixedly mounted in said container and connected to the terminals of said lamp, and said contact means having a portion accessible exteriorly of said encapsulating material.

3. An encapsulating light source as set forth in claim 2 and including a plate of transparent material positioned in registration with the opening in said container and being overlayed by said encapsulating material.

4. An encapsulated light source as set forth in claim 2, wherein said encapsulating material has optical qualities and is shaped to form a lens in registration with said opening.

5. An encapsulated light source comprising a closed metallic container formed with an opening in one side wall thereof, a lamp supporting means including a metallic U-shaped member having a bottom wall fixed to the container in heat exchanging relation therewith and having upstanding end walls, a high operating temperature elongated quartz lamp, the end portions of said lamp being fixedly mounted in said upstanding end walls of said lamp support in heat exchanging relation thereto, said lamp being positioned by said support in spaced relation to the walls of said container and in registration with the opening therein, said container being fully encapsulated in transparent plastic material having elastomeric qualities, current conducting contact means fixedly mounted in said container and connected to the terminals of said lamp, and said contact means having a portion accessible exteriorly of said encapsulating material.

References Cited

UNITED STATES PATENTS

| 3,140,831 | 7/1964 | Strange | 240—8.16 |
| 3,194,953 | 7/1965 | Friedland | 240—8.16 |

NORTON ANSHER, *Primary Examiner.*

D. L. JACOBSON, *Assistant Examiner.*